US012713510B2

(12) United States Patent
Schulteis

(10) Patent No.: US 12,713,510 B2
(45) **Date of Patent: *Aug. 18, 2026**

(54) AIR BLOWER AND/OR VACUUM WITH STATIC CHARGE MITIGATION

(71) Applicant: THE TORO COMPANY, Bloomington, MN (US)

(72) Inventor: Landon M. Schulteis, Prior Lake, MN (US)

(73) Assignee: THE TORO COMPANY, Bloomington, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/256,786

(22) Filed: Jul. 1, 2025

(65) Prior Publication Data

US 2026/0013024 A1 Jan. 8, 2026

Related U.S. Application Data

(63) Continuation of application No. 18/646,030, filed on Apr. 25, 2024, now Pat. No. 12,363,816.

(60) Provisional application No. 63/463,987, filed on May 4, 2023.

(51) Int. Cl.

| | |
|---|---|
| ***H05F 3/06*** | (2006.01) |
| ***A01G 20/47*** | (2018.01) |
| ***F04D 25/06*** | (2006.01) |
| ***F04D 29/40*** | (2006.01) |

(52) U.S. Cl.

CPC ............... *H05F 3/06* (2013.01); *A01G 20/47* (2018.02); *F04D 25/0673* (2013.01); *F04D 29/403* (2013.01)

(58) Field of Classification Search

CPC ...... F04D 25/0673; F04D 29/403; H05F 3/06; A01G 20/47

See application file for complete search history.

(56) References Cited

U.S. PATENT DOCUMENTS

| | | | |
|---|---|---|---|
| 6,552,891 B1 | 4/2003 | Prach | |
| 7,561,403 B2 | 7/2009 | Onezawa et al. | |
| 9,179,811 B2 | 11/2015 | Fukunaga et al. | |
| 11,406,726 B1 * | 8/2022 | Yu | A61L 2/10 |

(Continued)

FOREIGN PATENT DOCUMENTS

| | | |
|---|---|---|
| JP | 4025543 B2 | 12/2007 |
| JP | 4668860 B2 | 4/2011 |

(Continued)

OTHER PUBLICATIONS

"Difference between DC power and AC power," Matsusada Precision, Aug. 12, 2021; Obtained online on Oct. 4, 2024 by Examiner in parent application; 8 pages.

*Primary Examiner* — Andrew J Marien
(74) *Attorney, Agent, or Firm* — Mueting Raasch Group

(57) ABSTRACT

An apparatus may be configured as a blower, vacuum, or combination thereof. The apparatus includes a fan and motor operable to generate an airflow. A flow tube of the apparatus has an inlet end, an outlet end and an interior surface. The flow tube is coupled receive the airflow at the inlet end and deliver the airflow to the outlet end. An ion generator of the apparatus is operable to ionize the airflow moving through the interior surface of the flow tube to reduce static electrical charges induced within at least the flow tube.

15 Claims, 4 Drawing Sheets

(56) References Cited

U.S. PATENT DOCUMENTS

| | | | | |
|---|---|---|---|---|
| 12,363,816 | B2 | 7/2025 | Schulteis | |
| 2005/0022331 | A1 | 2/2005 | Kim et al. | |
| 2009/0207547 | A1 * | 8/2009 | Terasaki | B03C 3/368 361/231 |
| 2011/0181996 | A1 * | 7/2011 | Caffarella | H01T 23/00 361/231 |
| 2013/0202413 | A1 * | 8/2013 | Nock | F04D 29/703 415/121.2 |
| 2015/0134179 | A1 | 5/2015 | Murakami et al. | |
| 2015/0327352 | A1 | 11/2015 | Kikuchi et al. | |
| 2015/0355693 | A1 * | 12/2015 | Chang | G06F 1/1632 361/679.48 |
| 2016/0208822 | A1 * | 7/2016 | Barth | E01H 1/0809 |
| 2016/0309661 | A1 * | 10/2016 | Eakins, Jr. | A01G 20/47 |
| 2017/0113229 | A1 * | 4/2017 | Griffiths | B03C 3/155 |
| 2019/0098844 | A1 * | 4/2019 | Yang | A01G 20/47 |

FOREIGN PATENT DOCUMENTS

| | | | |
|---|---|---|---|
| JP | 5809021 | B2 | 11/2015 |
| KR | 2007-0023053 | A | 2/2007 |
| WO | 2016/138961 | A1 | 9/2016 |

* cited by examiner

AIR BLOWER AND/OR VACUUM WITH STATIC CHARGE MITIGATION

This application is a continuation of U.S. patent application Ser. No. 18/646,030, filed Apr. 25, 2024, which claims priority to and/or the benefit of U.S. Provisional Patent Application No. 63/463,987, filed May 4, 2023, all of which are incorporated herein by reference in their entireties.

SUMMARY

The present disclosure is directed to apparatuses and methods that facilitate reducing static in an air blower with static mitigation. In one embodiment, an apparatus is configured as a blower, vacuum, or combination thereof. The apparatus includes a fan and motor operable to generate an airflow. A flow tube of the apparatus has an inlet end, an outlet end, and an interior surface. The flow tube is coupled receive the airflow at the inlet end and deliver the airflow to the outlet end. An ion generator of the apparatus is operable to ionize the airflow moving through the interior surface of the flow tube to reduce static electrical charges induced within at least the flow tube.

In another embodiment, a blower includes a fan and motor operable to generate an airflow from an outlet of the fan. A flow tube of the blower includes an inlet end coupled to receive the airflow from the outlet of the fan, an outlet end coupled to expel the airflow from the blower, and an interior surface that encloses the airflow. An ion generator of the blower is operable to ionize the airflow moving through the interior surface of the flow tube to reduce static electrical charges induced within at least the flow tube. These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures. The drawings are not necessarily to scale.

DETAILED DESCRIPTION

Figure 1:
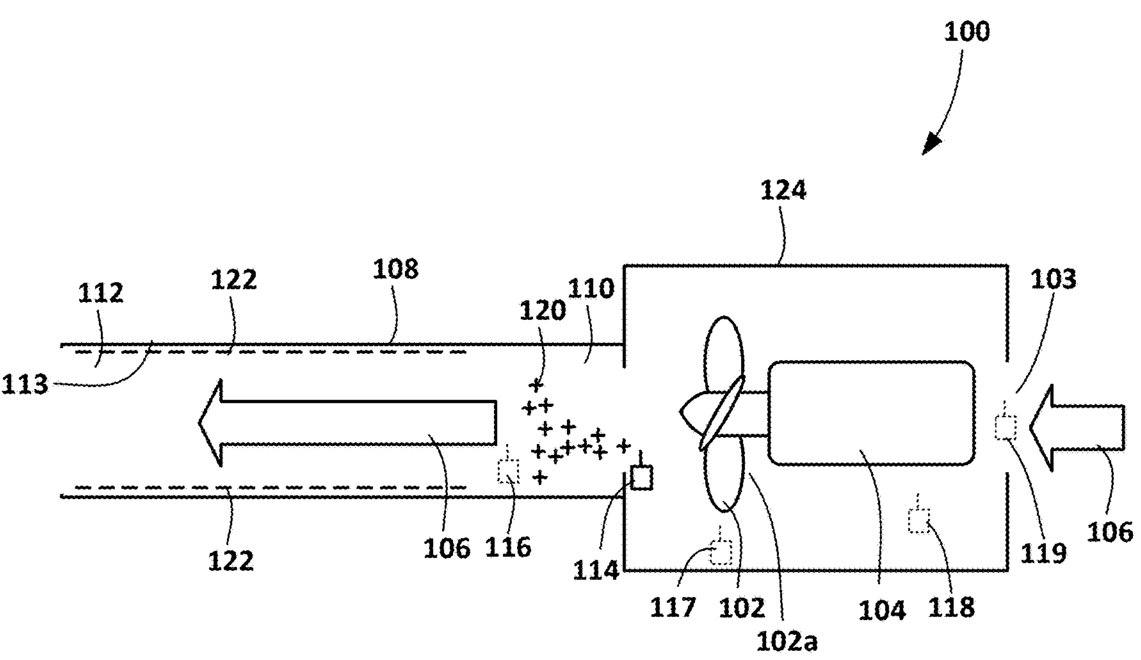
FIGS. 1 and 2 are block diagrams of an apparatus according to an example embodiment.

In the following detailed description of illustrative embodiments, reference is made to the accompanying figures of the drawing which form a part hereof. It is to be understood that other equivalent embodiments, which may not be described and/or illustrated herein, are also contemplated.

The present disclosure relates generally to hand-held power tools. One class of hand-held tools, commonly referred to as leaf blowers or debris blowers, are versatile tools that can be used to in place of manual debris moving tools such as rakes and brooms. Leaf blowers are often powered by a small, internal combustion engine (ICE) motor, which is effective but is noisy and requires regular maintenance, e.g., replacement of filters and spark plugs. Electric blowers are now commonly used as they tend to be quieter and easier to maintain than ICE blowers. Electric blowers may be corded (e.g., plugged into an AC outlet) or cordless (e.g., battery driven). For purposes of this disclosures, the terms "blower," "leaf blower," "yard blower," "debris blower," "outdoor blower," "handheld blower," etc., may be used interchangeably without loss of generality.

Some debris blowers can also double as vacuums. This may involve reversing rotation direction of a fan, adding a debris collection attachment, etc. Further a device that is primarily sold as handheld vacuum, shop vacuum, etc., may be similarly reconfigured as a blower. For example, some vacuums may have air input and air output ports with a common interface such that a hose can be attached to either the input or output port for different functions. For purposes of this disclosure, the description of a debris blower may also be construed to cover dual blower/vacuum devices, and the concepts described herein may be applicable to vacuum-only devices.

Plastic is commonly utilized for the structural components of a debris blower for a number of reasons, such as light weight, durability, resistance to oxidation, low cost and ease of manufacture of the product. One issue that is sometimes seen in handheld debris blowers is a buildup of static electricity on the housing. This buildup of electrical charge can be transferred to the user and can lead to an uncomfortable shock felt by the user when touching an object at a different electrical potential, e.g., an electrically grounded object. For example, the blower may have a control, e.g., trigger switch, that is electrically isolated from the housing, and the user can experience a shock when actuating the trigger switch. The buildup of static can also damage some electronic devices when it discharges, such as microprocessors that may be used for control and/or power conditioning of the debris blower, and devices carried by the user, e.g., a wearable device.

Static can build up on surfaces due to what is known as the triboelectric effect or triboelectric charging. The triboelectric effect is often associated with solid-to-solid contact and can be induced in a blower by particles mixed with air the enter through an inlet of the blower. The particles entrained in the blower airflow transfer significant charge due to contact with non-conductive materials, such as the plastics often used for forming blower housings and outlet tubes. This charge buildup can result in high static electric potentials, e.g., in the kV range.

Static electricity may be built up, for example, when blowing debris from a dusty enclosure, e.g., a garage. Static buildup is also known to be exacerbated by low atmospheric humidity. One situation where this may be seen is when a blower is used to clear snow. In such a case, the environment may combine a significant amount of airborne particles (e.g., ice particles) together with low relative humidity. Other factors, such as increasing speed of the airflow and/or volumetric flow rate of the airflow can increase the likelihood of a static buildup.

Figure 2:
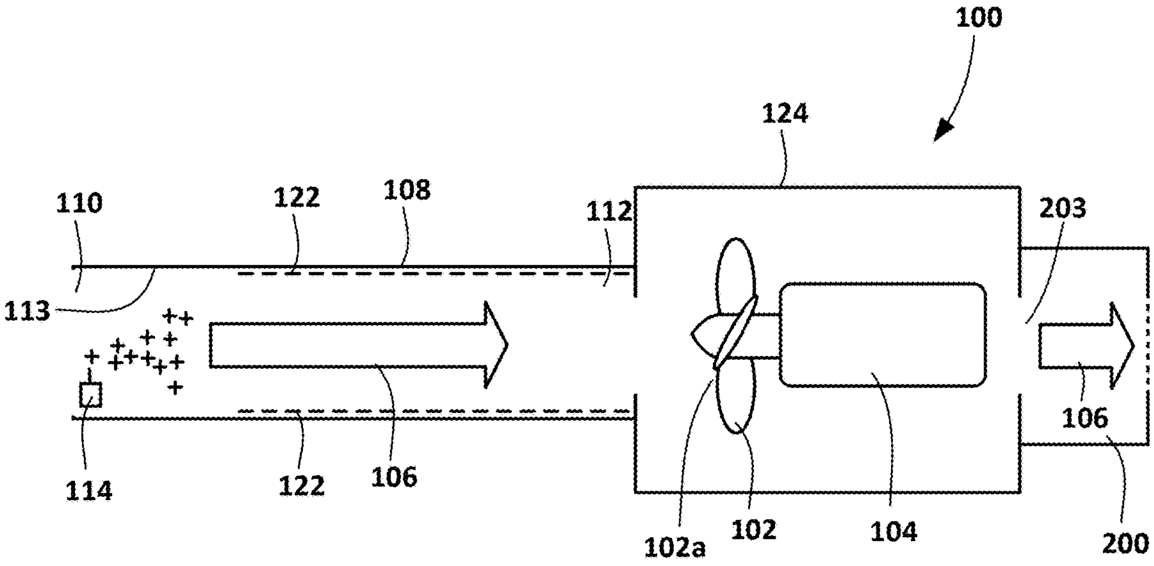

Embodiments described herein include devices and features that reduce the buildup of static electricity on housings of debris blowers, vacuums, and the like. In FIGS. 1 and 2, block diagrams show an apparatus 100 according to one or more embodiments. The apparatus 100 can be configured as a blower, vacuum, or combination thereof. In FIG. 1, the apparatus 100 is configured as a blower and FIG. 2 shows the apparatus 100 configured as a vacuum.

In reference now to FIG. 1, the apparatus 100 includes a fan 102 and motor 104 operable to generate an airflow 106.

The fan 102 and motor 104 are shown in an axial arrangement, in which the fan 102 and motor 104 rotate along an axis parallel to the airflow 106. Other fan/motor arrangements are possible without deviating from the scope of this disclosure, including radial arrangements (where the fan 102 and motor 104 rotate at right angles to the airflow 106) and cross flow arrangements (where the air is pulled in and expelled at different angles).

A flow tube 108 has an inlet end 110, an outlet end 112 and an interior surface 113. In a blower, the flow tube 108 may be referred to as an outlet tube and in a vacuum, it may be referred to as an inlet tube. Generally, the flow tube 108 is a closed air flow path that is elongated, which helps in placing the outlet end 112 close to the target (e.g., the ground). The flow tube 108 may have a taper (not shown) to increase flow velocity at the open end. The flow tube 108 may sometimes be called a nozzle, outlet/inlet tube, blower tube, duct, etc. The flow tube 108 is attached to a housing 124 and coupled receive the airflow 106 at the inlet end 110 and deliver the airflow 106 to the outlet end 112. The flow 106 enters the housing 124 at and inlet end 103.

An ion generator 114 is operable to ionize the airflow 106 moving through the interior surface of the flow tube to reduce static electrical charges induced within at least the flow tube 108. The ion generator 114 is shown between the fan 102 and the inlet end 110 of the flow tube 108 proximate the inlet end 110 but outside of the flow tube 108, although other locations 116-119 may be possible. For example, location 116 is within the flow tube 108 near the inlet end 110, location 117 is aligned with blades of the fan 102, location 118 is between the fan 102 and an air inlet 103, and location 119 is within the air inlet 103. Locations 117 and 118 are both located an inlet end 102*a* of the fan 102 facing away from the inlet end 110 of the flow tube 108, such that the ion generator is operable to ionize the airflow 106 before the airflow 106 enters the fan 102. Note that the inlet end 102*a* is on a different side of the fan 102 in FIG. 2.

The ion generator 114 can be placed anywhere it can effectively emit ions 120 at a point in the airflow 106 such that it can be distributed along the tube interior surface 113 to neutralize the charges 122 at that surface. This can reduce static charge on both the flow tube 108 and the housing 124. Note that the ion generator 114 is shown emitting positively charged ions 120 and the interior surface 113 has negative charges 122. This is dependent on the materials of the tube 108 and particles in the airstream 106. The electrical charges can be reversed from what is shown here, e.g., ion generator 114 can emit negatively charged ions to neutralize positive charges on the interior surface 113.

In FIG. 2, the apparatus 100 is shown configured as a vacuum. Generally, this may involve changing the direction of the airflow 106 such that the locations of the inlet end 110 and outlet end 112 are reversed relative to what is shown in FIG. 1. The change in flow may be achieved by reversing direction of the motor 104, and may involve other changes, such as the addition of a debris catcher 200 covering an air outlet 203. As with previous embodiments, the location of the ion generator 114 may vary from the location shown in FIG. 2. The ion generator 114 can be located anywhere that it can reduce charge on the flow tube 108 and possibly the housing 124.

Generally, the ion generator 114 includes a high voltage source, such as a micro-transformer or voltage multiplier which can provide on the order of multiple kV potential at very low current, e.g., on the order of microamps. This potential is applied to an ion emitter of the ion generator 114, e.g., a wire, peg, bush, wick, etc., which serves as a corona discharge element that is exposed to the airflow 106. The power consumed by the ion generator 114 may be on the order of 1/10ths of a watt, which is typically multiple orders of magnitude less than that consumed by an electric motor (e.g., 1 kW or more) that is used to drive the fan 102.

It has been found that instances of static shock are more prevalent on handheld, electrically-driven, blowers/vacuums. While corded electric blowers/vacuums may also induce this type of static charge on the housing during use, such devices can use the electrical lines as a conductive discharge path for static. A battery powered device may not have a readily available conductive discharge path other than the operator. A non-handheld device, whether cordless or not, may be in contact with the ground or other surface, and thus may be able to discharge directly to the ground or other surface, e.g., using a conductive brush, metallic wheel, etc. Nonetheless, both corded and non-handheld devices may benefit from an ion generator, e.g., as another line of defense against static build-up.

A handheld device is generally understood herein to be a device for which the user serves as the primary path to electrical ground during use. This does not require that the user hold or support the device in their hands. For example, the device may be carried on a shoulder strap, a backpack-style harness, or the like. The user may at least use their hand or hands to manipulate some part of the device, e.g., point the flow tube 108, activate an on/switch or other controls (e.g., speed, mode, safety lockouts). Generally, any device that is carried by the user off the ground while in use for a significant amount of time such that static electricity is generated in or on a housing of the device may be considered a handheld device.

As noted above, housings of handheld devices such as debris blowers are often made of plastics, injection moldable plastics such as acrylonitrile butadiene styrene (ABS), polyamide (PA, or nylon), polycarbonate (P, or Lexan), high- or low-density polyethylene (HDPE/LDPE), etc. These materials are often high on the triboelectric series, meaning that they tend to build up static charges more easily than other materials (e.g., metals). Anti-static or static dissipative plastics are known, as well as plastic composites embedded with metal or carbon particles or fibers. While these materials by themselves may not significantly reduce static charges on the housing of the apparatus 100, they may help in moving charges around, e.g., increase conduction of electrons along the structure. Therefore, such materials may be useful when combined with the ion generator 114, e.g., increase effectiveness of static mitigation, reduce sensitivity on placement of the ion generator 114 within the housing of the apparatus 100, etc.

Figure 3:
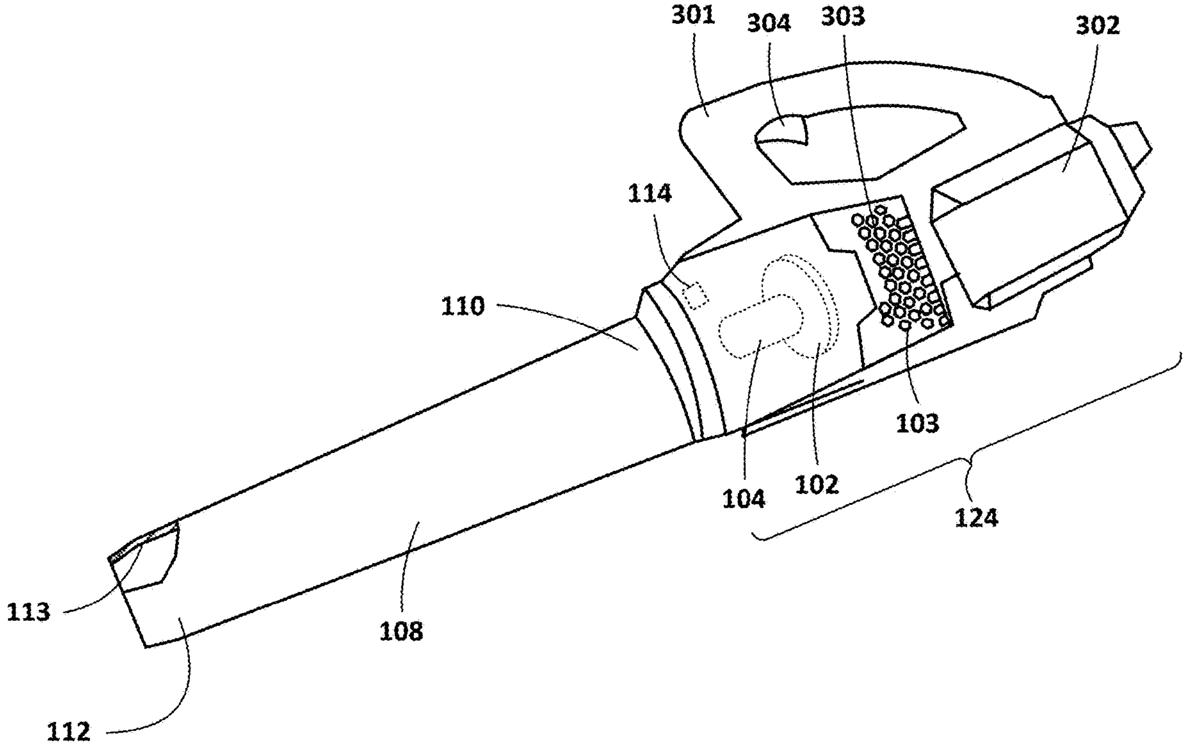
FIG. 3 is a perspective view of a blower according to an example embodiment.

In FIG. 3, a perspective view shows details of a battery powered debris blower apparatus 100 according to an example embodiment. This figure shows similar components as in FIGS. 1 and 2 with additional components such as removable battery 302. Also shown attached to or integrated with the housing 124 are handle 301, inlet grating 303, and trigger switch 304. The housing 124 and flow tube 108 are shown here as separate components, although in some embodiments they may be formed from a single part, e.g., two parts that are permanently joined through bonding or welding. The handle 301 and inlet grate 303 may also be integrated with the housing 124 and/or be separately attached parts (e.g., secured by snaps, fasteners, etc.). The trigger switch 304 is movable relative to the housing 124 and is used to activate/control the motor 104. In this disclosure, the same reference number is used to refer to both the mechanical and electrical parts of the trigger switch 304.

In the example shown in FIG. 3, the ion generator is shown in a forward part of the housing 124, between the fan 102 and flow tube 108. This location may be convenient for reasons given above (e.g., reduces charges within the flow tube) and is also proximate to other electrical components such as the motor 104 and trigger switch 304, and so facilitates a relatively short wiring run from the battery 302. Other considerations may be taken into consideration when locating the ion generator 114, such as exposure to airflow, available space/clearances, operating temperatures, ease of assembly and/or maintenance, etc.

Note that the ion generator 114 may not be needed under some conditions, e.g., high ambient humidity, relatively few airborne particles, low air speeds. Even so, the power used by the ion generator 114 may be an insignificant fraction of the total power consumption of the apparatus while running and so may always be run at the same time as the motor 104 without significantly impacting battery power consumption. Running the ion generator 114 when there is little or no static build up may output ionized air, however this is not considered detrimental. Thus, as seen in the circuit diagram of FIG. 4, the ion generator 114 may be switched on and off together with the motor 104 in one or more embodiments.

Figure 4:
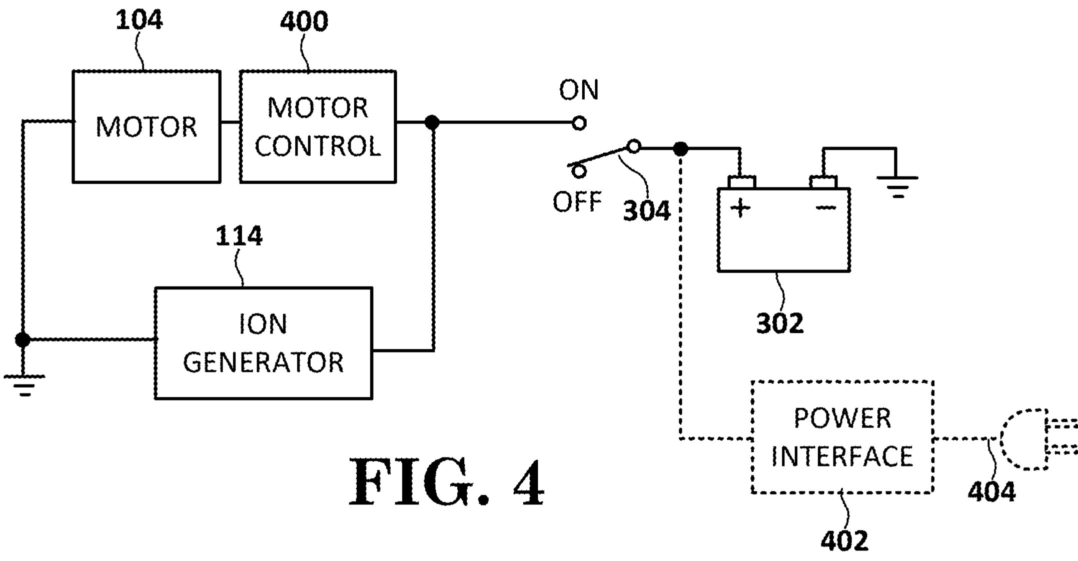
FIGS. 4 and 5 are circuit diagrams illustrating activation and control of an ion generator according to an example embodiment.
Figure 5:
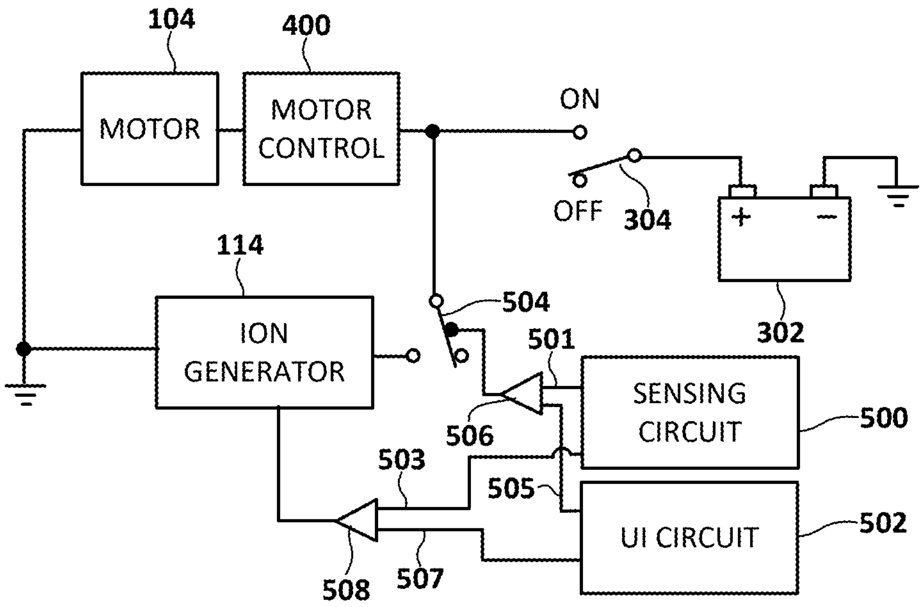

A motor controller 400 is also shown in FIGS. 4 and 5, which may be used, e.g., for direct current (DC) applications. The motor controller 400 may regulate voltage and/or current, provide fault detection, control motor speed and activation, etc. The ion generator 114 may also include analogous circuitry (not shown) to regulate power, detect faults, change ionization level and/or polarity, etc. The ion generator 114 and motor 104 are connected in parallel to the trigger switch 304 such that battery power is applied to and removed from both at the same time. There may be other components in this circuit, such as a safety lockout switch, which are not shown here. Note that the electrical ground symbol is used in FIGS. 4 and 5 to indicate a common reference potential within the device, but this is not intended to indicate earth ground or the like.

Also seen in FIG. 4 are a power interface 402 and power line cord 404 that may optionally be used instead of or in addition to the battery 302 in a corded application. In a corded application, the power line cord 404 provides operational power from a source such as alternating current (AC) mains, generator, inverter, etc. The power interface 402 may include any combination of a fuse, circuit breaker, line filter, fuse, AC-DC converter, etc.

In some embodiments, it may be desired to automatically or manually control operation of the ion generator 114 in addition to activation from the main trigger switch 304. An example of this is shown in the circuit diagram of FIG. 5. One or both of a sensor circuit 500 and user interface circuit 502 may be used to affect activation and deactivation of the ion generator 114 during use, a polarity of ionization, and/or a magnitude of the ionization voltage.

The sensing circuit 500 may include a charge sensor (e.g., voltage sensor) that produces a charge sensor signal indicative of at least one of polarity and magnitude of the static electrical charges. This may be accomplished, for example, by measuring a voltage between a surface of the apparatus 100 and some electrical potential reference, e.g., a terminal of the battery 302. The sensing circuit 500 may also or instead include a humidity sensor producing a signal indicative of ambient air humidity. This could disable the ion generator 114 when the humidity goes above a threshold, for example.

A first output 501 of the sensing circuit 500 is used for enabling and disabling the ion generator 114, e.g., via switching element 504, e.g., a relay or transistor. A second output 503 of the sensing circuit 500 can be used, instead or in addition to the first output 501, to adjust one or both of an output polarity and output magnitude of the ion generator 114. While the first output 501 also changes the output magnitude of the ion generator 114 from zero to some zero amount, the output 503 may be used to set ion generator voltage to one or more intermediate value between maximum ionization voltage and zero volts.

The user interface circuit 502 may include a switch, potentiometer, or other user accessible circuit element. A first output 505 of the user interface circuit 502 is used for enabling and disabling the ion generator 114, e.g., via switching element 504. An AND gate 506 is shown coupling the two enable/disable first outputs 501, 505 for purposes of illustration, and other components could be used if both circuits 500, 502 are used, e.g., an OR gate. A second output 507 of the user interface circuit 502 can be used, instead of or in addition to the first output 505, to adjust one or both of an output polarity and output magnitude of the ion generator 114. As with the enable/disable outputs, the outputs 503, 507 may be combined via an AND gate 508 or other suitable circuit element. Note that, while not shown, the circuit in FIG. 5 may use a power interface 402 and power line cord 404 as shown in FIG. 4 and described above.

Figure 6:
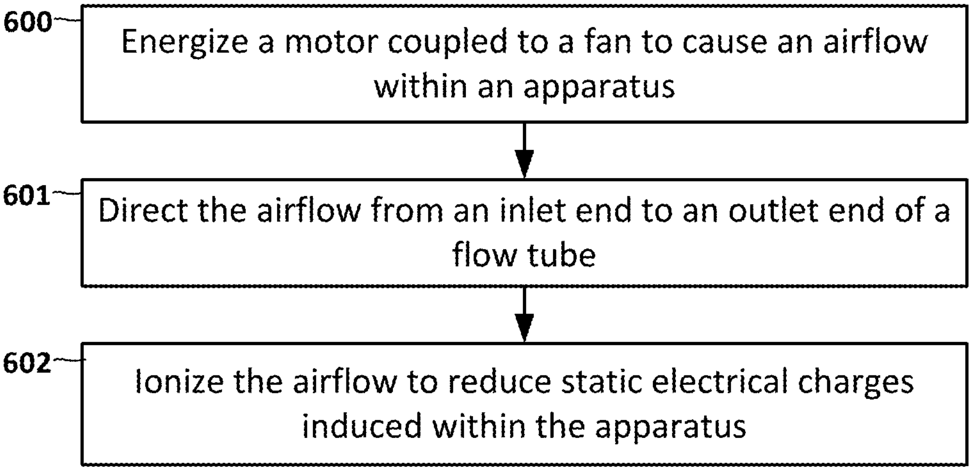
FIG. 6 is a flowchart showing a method according to example embodiments.

In FIG. 6, a flowchart shows a method according to an example embodiment. The method involves energizing 600 a motor coupled to a fan to cause an airflow within an apparatus. The airflow is directed 601 from an inlet end to an outlet end of a flow tube. The airflow is ionized 602 via an electrical ion generator to reduce static electrical charges induced within the apparatus. The static electrical charges are due, at least in part, to the airflow moving through an interior surface of the flow tube.

While the present disclosure is not so limited, an appreciation of various aspects of the disclosure will be gained through a discussion of the specific illustrative examples provided below. Various modifications of the illustrative examples, as well as additional embodiments of the disclosure, will become apparent herein.

Example 1 includes an apparatus configured as a blower, vacuum, or combination thereof, comprising: a fan and motor operable to generate an airflow; a flow tube having an inlet end, an outlet end and an interior surface, the flow tube coupled receive the airflow at the inlet end and deliver the airflow to the outlet end; and an ion generator operable to ionize the airflow moving through the interior surface of the flow tube to reduce static electrical charges induced within at least the flow tube.

Example 2 includes the apparatus of example 1, wherein the apparatus is configured as the blower, and wherein and the fan forces the airflow into the inlet end of the flow tube. Example 3 includes the apparatus of example 2, wherein the ion generator is located between the fan and the inlet end of the flow tube. Example 4 includes the apparatus of example 2, wherein the ion generator is located at an inlet of the fan facing away from the inlet end of the flow tube, and wherein the ion generator operable to further ionize the airflow before the airflow enters the fan.

Example 5 includes the apparatus of any preceding example, wherein the motor comprises an electric motor. Example 6 includes the apparatus of example 5, wherein the electric motor and the ion generator are powered by a battery. Example 7 includes the apparatus of example 5, wherein the electric motor and the ion generator are powered by a cord coupled to an AC power source.

Example 8 includes the apparatus of any preceding example, further comprising a charge sensor that produces a charge sensor signal indicative of at least one of polarity and magnitude of the static electrical charges, the charge sensor signal used to perform at least one of: adjusting one or both of an output polarity and output magnitude of the ion generator; and enabling and disabling the ion generator. Example 9 includes the apparatus of any preceding example, further comprising a humidity sensor producing a humidity sensor signal, the humidity sensor signal used to perform at least one of: adjusting an output magnitude of the ion generator in response to a change in humidity indicated by the humidity sensor signal; and enabling and disabling the ion generator in response to a threshold humidity indicated by the humidity sensor signal.

Example 10 includes the apparatus of any preceding example, wherein the flow tube and a housing of the apparatus comprise non-conductive material, the apparatus further comprising a conductive material that electrically couples the flow tube with the housing to discharge an outer surface of the apparatus. Example 11 includes the apparatus of example 10, wherein the conductive material is embedded in a polymer used to form one or both of the flow tube and the housing.

Example 12 includes the apparatus of example 1, wherein the reduction of the static electrical charges reduces or eliminates a static electrical shock felt by a user when operating the apparatus. Example 13 includes the apparatus of any preceding example, wherein the apparatus is configured as a handheld blower, handheld vacuum, or combination thereof. Example 14 includes the apparatus of any preceding example, wherein the flow tube comprises a plastic.

Example 15 is a blower comprising: a fan and motor operable to generate an airflow from an outlet of the fan; a flow tube comprising: an inlet end coupled to receive the airflow from the outlet of the fan; an outlet end coupled to expel the airflow from the blower; and an interior surface that encloses the airflow; and an ion generator operable to ionize the airflow moving through the interior surface of the flow tube to reduce static electrical charges induced within at least the flow tube.

Example 16 includes the blower of example 15, wherein the ion generator is located between the outlet of the fan and the inlet end of the flow tube. Example 17 includes the blower of example 15, wherein the ion generator is located at an inlet of the fan facing away from the inlet end of the flow tube, and wherein the ion generator operable to further ionize the airflow before the airflow enters the fan. Example 18 includes the blower of any preceding blower example, wherein the motor comprises an electrical motor, the blower further comprising a battery coupled to the motor and the ion generator.

Example 19 includes the blower of any preceding blower example, further comprising an electrical charge sensor that produces a charge sensor signal indicative of at least one of charge polarity and charge magnitude of the airflow, the charge sensor signal used to perform at least one of: adjusting one or both of an output polarity and output magnitude of the ion generator; and enabling and disabling the ion generator. Example 20 includes the blower of any preceding blower example, further comprising a humidity sensor producing a humidity sensor signal, the humidity sensor signal used to perform at least one of: adjusting an output magnitude of the ion generator in response to a change in humidity indicated by the humidity sensor signal; and enabling and disabling the ion generator in response to a threshold humidity indicated by the humidity sensor signal.

Example 21 includes the blower of any preceding blower example, wherein the flow tube and a housing of the blower comprise non-conductive material, the blower further comprising a conductive material that electrically couples the flow tube with the housing to discharge an outer surface of the blower. Example 22 includes the blower of example 21, wherein the conductive material is embedded in a polymer used to form one or both of the flow tube and the housing. Example 23 includes the blower of any preceding blower example, wherein the reduction of the static electrical charges reduces or eliminates a static electrical shock felt by a user when operating the blower. Example 24 includes the blower of any preceding blower example, wherein the blower comprises a handheld blower.

Example 25 is a method comprising: energizing a motor coupled to a fan to cause an airflow within an apparatus; directing the airflow from an inlet end to an outlet end of a flow tube; and via an electric ion generator, ionizing the airflow to reduce static electrical charges induced within the apparatus, the static electrical charges due at least in part to the airflow moving through an interior surface of the flow tube.

Example 26 includes the method of example 25, wherein the apparatus comprises a battery powered blower. Example 27 includes the method of any preceding method example, wherein the ionizing of the airflow occurs before the airflow enters the fan. Example 28 includes the method of any preceding method example, wherein the ionizing of the airflow occurs after the airflow exits the fan. Example 29 includes the method of any preceding method example, wherein the motor and the electric ion generator are powered via a battery, and wherein the apparatus comprises a handheld debris blower.

While the present disclosure is not so limited, an appreciation of various aspects of the disclosure will be gained through a discussion of the specific illustrative aspects provided below. Various modifications of the illustrative aspects, as well as additional aspects of the disclosure, will become apparent herein.

It is noted that the terms "have," "include," "comprises," and variations thereof, do not have a limiting meaning, and are used in their open-ended sense to generally mean "including, but not limited to," where the terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the particular figure, or while the machine is in an operating configuration. These terms are used only to simplify the description, however, and not to limit the interpretation of any embodiment described. As used herein, the terms "determine" and "estimate" may be used interchangeably depending on the particular context of their use, for example, to determine or estimate a position or pose of a vehicle, boundary, obstacle, etc.

Further, it is understood that the description of any particular element as being connected to coupled to another element can be directly connected or coupled, or indirectly coupled/connected via intervening elements.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination and are not meant to be limiting, but purely illustrative. It is intended that the scope of the invention be limited not with this detailed description, but rather determined by the claims appended hereto.

The invention claimed is:

1. A method comprising:

energizing a motor coupled to a fan to cause an airflow within a flow tube of an apparatus;

directing the airflow from an inlet end to an outlet end of the flow tube; and via an electrical ion generator, ionizing the airflow before or near the inlet end of the flow tube to reduce static electrical charges induced within the flow tube.

2. The method of claim 1, wherein the apparatus comprises a blower.

3. The method of claim 2, wherein the blower comprises a handheld, battery-powered blower.

4. The method of claim 1, further comprising sensing at least one of a polarity or magnitude of the static electrical charges, and in response thereto, adjusting one or both of an output polarity and output magnitude of the electrical ion generator.

5. The method of claim 1, further comprising sensing at least one of a polarity or magnitude of the static electrical charges, and in response thereto, enabling or disabling the electrical ion generator.

6. The method of claim 1, further comprising sensing ambient air humidity, and in response thereto, adjusting an output magnitude of the electrical ion generator in response to a change in the humidity.

7. The method of claim 1, further comprising sensing ambient air humidity, and in response thereto, enabling or disabling the electrical ion generator in response to a threshold value of the ambient air humidity.

8. The method of claim 7, wherein the electrical ion generator is disabled if the ambient air humidity goes above a threshold.

9. The method of claim 1, further comprising enabling or disabling the ion generator in response to an output from a user interface circuit.

10. The method of claim 1, wherein the electrical ion generator is located between the fan and the inlet end of the flow tube.

11. The method of claim 1, wherein the electrical ion generator is located at an inlet of the fan facing away from the inlet end of the flow tube.

12. The method of claim 1, wherein the electrical ion generator is located within a housing that encloses the fan and the motor.

13. The method of claim 1, wherein the electrical ion generator is located at an air inlet of a housing.

14. The method of claim 1, wherein the motor and the electrical ion generator are powered via a battery.

15. The method of claim 1, wherein the fan and the motor rotate along an axis parallel to the airflow.

* * * * *